United States Patent
Fukawa et al.

(10) Patent No.: US 7,165,126 B2
(45) Date of Patent: Jan. 16, 2007

(54) DIRECT MEMORY ACCESS DEVICE

(75) Inventors: Norifumi Fukawa, Kawasaki (JP); Nobuhiko Akasaka, Kawasaki (JP); Koichi Yamamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/079,136

(22) Filed: Mar. 15, 2005

(65) Prior Publication Data

US 2005/0160202 A1    Jul. 21, 2005

Related U.S. Application Data

(62) Division of application No. 10/354,023, filed on Jan. 30, 2003, now Pat. No. 6,883,041.

(30) Foreign Application Priority Data

Mar. 19, 2002   (JP) .............................. 2002-077220

(51) Int. Cl.
*G06F 13/28* (2006.01)
*G06F 3/00* (2006.01)
*G06F 13/00* (2006.01)

(52) U.S. Cl. ............................. 710/22; 710/30; 710/33
(58) Field of Classification Search ............ 710/22–30, 710/32–35, 305–308, 6
See application file for complete search history.

(56) References Cited

U.S. PATENT DOCUMENTS

| | | | |
|---|---|---|---|
| 4,631,671 A * | 12/1986 | Kawashita et al. ............ 710/22 |
| 4,631,674 A | 12/1986 | Blandy | |
| 5,014,187 A * | 5/1991 | Debize et al. ................. 710/66 |
| 5,187,783 A * | 2/1993 | Mansfield et al. ............ 710/23 |
| 5,214,767 A * | 5/1993 | Wanner et al. ................. 710/22 |
| 5,265,228 A * | 11/1993 | Beaudoin et al. ........... 710/306 |
| 5,297,242 A | 3/1994 | Miki | |
| 5,333,294 A | 7/1994 | Schnell | |
| 5,499,383 A * | 3/1996 | Yamasaki ..................... 710/22 |
| 5,692,218 A * | 11/1997 | Allen et al. ................... 710/33 |
| 5,754,884 A | 5/1998 | Swanstrom | |
| 2002/0062408 A1 | 5/2002 | Jahnke et al. | |

FOREIGN PATENT DOCUMENTS

| | | |
|---|---|---|
| EP | 0 997 822 A2 | 5/2000 |
| JP | 61-150055 | 7/1986 |
| JP | 63083844 A | 4/1988 |
| JP | 04076647 A | 3/1992 |
| JP | 5-242012 | 9/1993 |

OTHER PUBLICATIONS

MS Computer Dictionary, 5th edition, pp. 446, 447.*

* cited by examiner

*Primary Examiner*—Fritz Fleming
*Assistant Examiner*—David Martinez
(74) *Attorney, Agent, or Firm*—Arent Fox PLLC

(57) ABSTRACT

A direct memory access device is provided which includes: a designation unit for designating transfer modes, when receiving an instruction to transfer data, to perform byte transfers or word transfers for first and last data of the data and word transfers for all other data; and a transfer unit for performing a data transfer by direct memory access from a data transfer source to a data transfer destination by the designated transfer modes.

8 Claims, 14 Drawing Sheets

F I G. 1
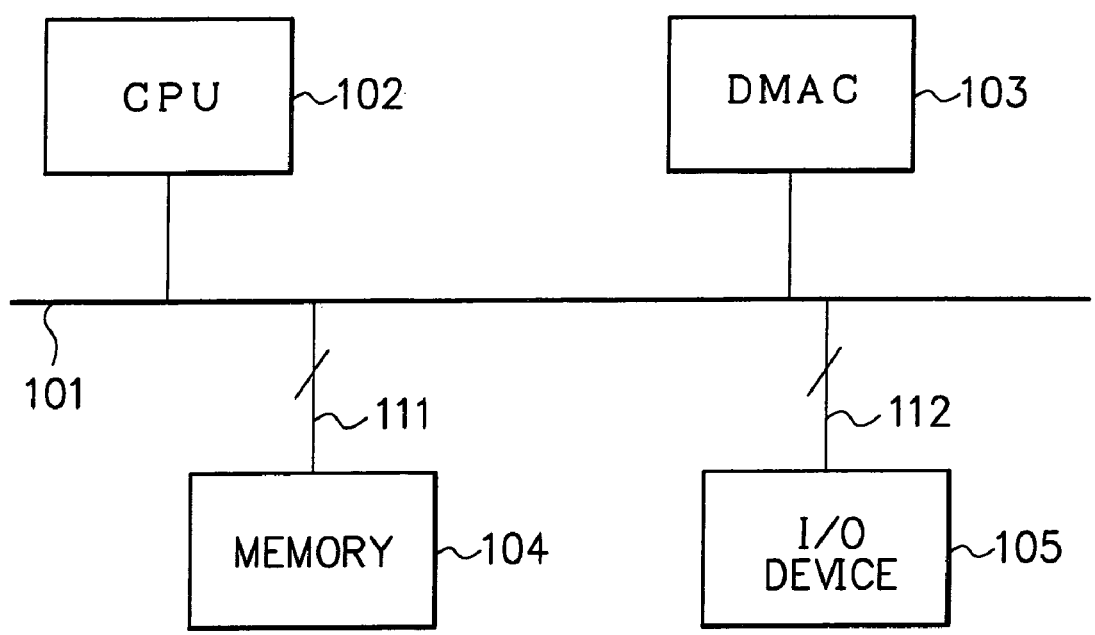

F I G. 2
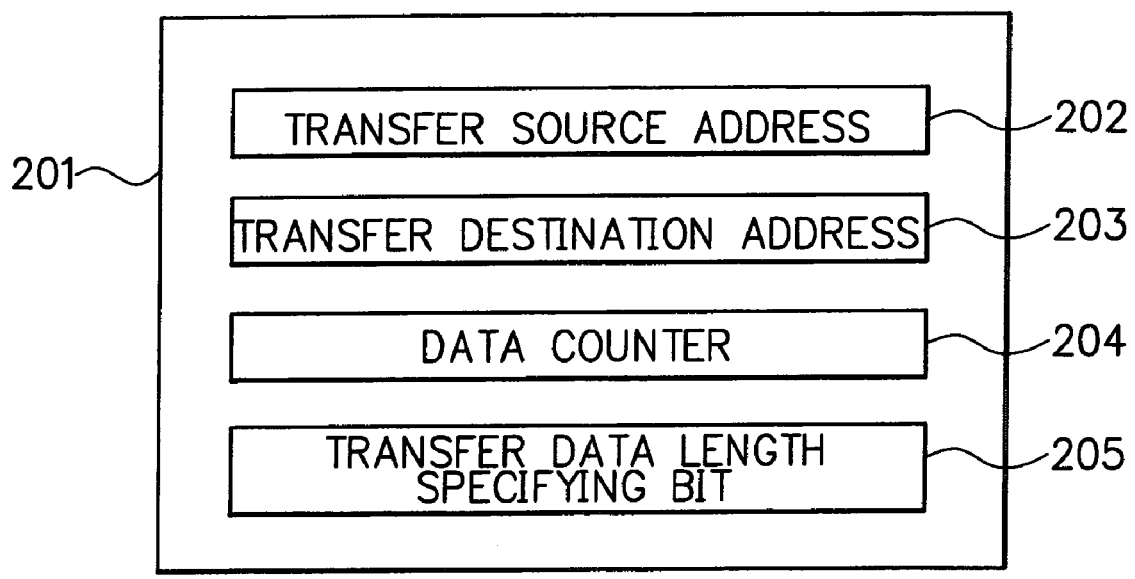

F I G. 7
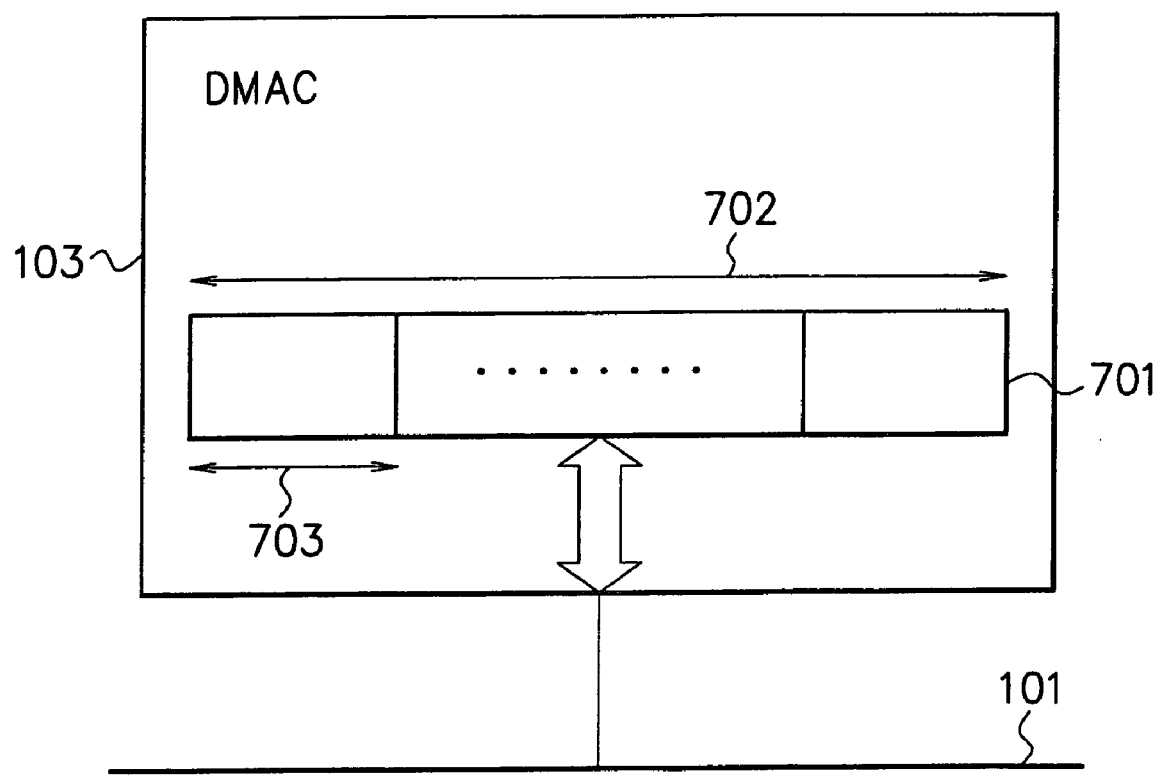

F I G. 9
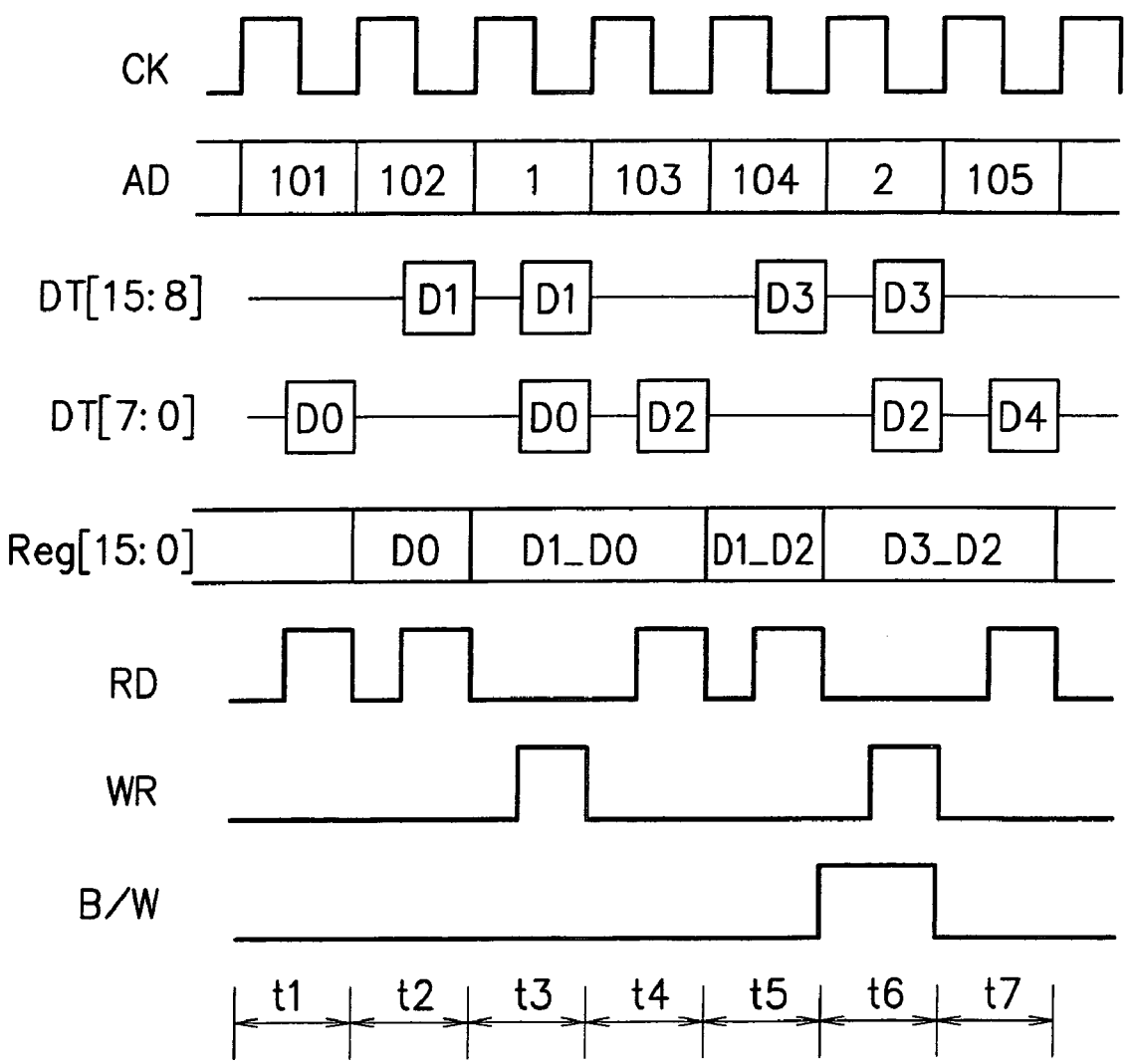

F I G. 12

| (SA,DA) \ (SB,DB) | (0,0) | (0,1) | (1,0) | (1,1) |
|---|---|---|---|---|
| (0,0) | NORMAL DMA TRANSFER | A | E | NORMAL DMA TRANSFER |
| (0,1) | NORMAL DMA TRANSFER | B | F | NORMAL DMA TRANSFER |
| (1,0) | NORMAL DMA TRANSFER | C | G | NORMAL DMA TRANSFER |
| (1,1) | NORMAL DMA TRANSFER | D | H | NORMAL DMA TRANSFER |

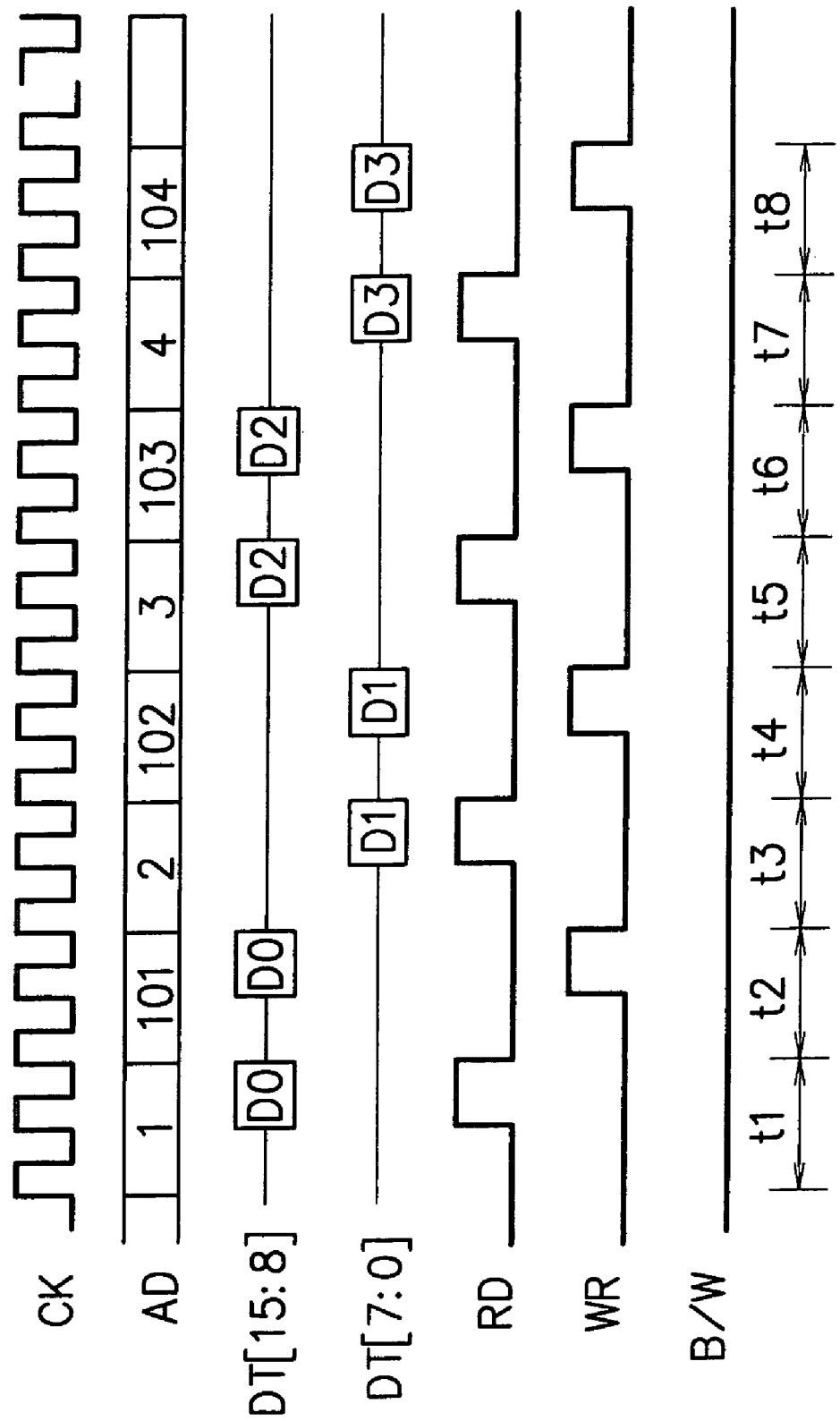

DIRECT MEMORY ACCESS DEVICE

CROSS-REFERENCE TO RELATED APPLICATIONS

This application is a divisional application which claims the benefit of U.S. patent application Ser. No. 10/354,023, filed Jan. 30, 2003 now U.S. Pat. No. 6,883,041, which is based upon and claims the benefit of priority from the prior Japanese Patent Application No. 2002-077220, filed on Mar. 19, 2002, the entire contents of which are incorporated herein by reference.

BACKGROUND OF THE INVENTION

1. Field of the Invention

The present invention relates to a direct memory access device and, more specifically, to a direct memory access device which controls a data transfer mode.

2. Description of the Related Art

FIG. 13 shows a direct memory access method according to a prior art. In direct memory access (DMA), data are transferred between an input/output device and a memory or between memories. A clock CK is a synchronous clock for DMA. As for an address AD, for example, locations 0 through 99 are data transfer source addresses and locations 100 through 199 are data transfer destination addresses. In the locations 1 to 3, data D0 to D2 are stored respectively. The data D0 to D2 are 1 byte each, and thus 3 bytes in total. A data bus DT is 1 word (16 bits) wide. As for the data bus DT, 0 to 7 bits are a first byte and 8 to 15 bits are a second byte. A pulse of a read signal RD indicates a read instruction, and a pulse of a write signal WR indicates a write instruction. As for a transfer mode B/W, its low level indicates a byte transfer, and its high level indicates a word transfer. Hereinafter, a case is explained in which the data D0 to D2 having a 3-byte (odd-byte) length are transferred.

First, the data D0 are read from the location 1 of the address AD at a timing t1, and the data D0 are written into the location 101 of the address AD at a timing t2. Then, the data D1 are read from the location 2 of the address AD at a timing t3, and the data D1 are written into the location 102 of the address AD at a timing t4. At last, the data D2 are read from the location 3 of the address AD at a timing t5, and the data D2 are written into the location 103 of the address AD at a timing t6, the data transfer coming to an end.

Word transfers are possible for a transfer of data starting from an even address, but in the case of data starting from an odd address as described above (the location 1), byte transfers are performed for all of the data. Assuming that a set of read and write is one cycle, this data transfer takes three cycles.

FIG. 14 shows another DMA method according to the prior art. An exemplary case of a transfer of data starting from a location 1 (an odd address) and having a 4-byte (even-byte) length is explained here.

First, data D0 are read from a location 1 of an address AD at a timing t1, and the data D0 are written into a location 101 at a timing t2. Then, data D1 are read from a location 2 at a timing t3, and the data D1 are written into a location 102 at a timing t4. Subsequently, data D2 are read from a location 3 at a timing t5, and the data D2 are written into a location 103 at a timing t6. At last, data D3 are read from a location 4 at a timing t7, and the data D3 are written into a location 104 at a timing t8, the data transfer coming to an end.

Since this case is also the transfer of data starting from an odd address (the location 1), byte transfers are performed for all of the data. Assuming that a set of read and write is one cycle, this data transfer takes four cycles.

A data transfer in words only requires half the number of transfers of that in bytes. Data can be transferred more quickly as the number of transfers is reduced, but data starting from an odd address cannot be transferred in words but in bytes.

In addition, data are transferred between devices having different data bus widths to match the data bus having a smaller width. This causes frequent use of the bus, interfering with efficient use of the bus.

SUMMARY OF THE INVENTION

It is an object of the present invention to perform direct memory access by efficiently controlling a data transfer mode.

According to an aspect of the present invention, a direct memory access device is provided which includes: a designation unit for designating transfer modes, when receiving an instruction to transfer data, to perform byte transfers or word transfers for first and last data of the data and word transfers for all other data; and a transfer unit for performing a data transfer by direct memory access from a data transfer source to a data transfer destination by the designated transfer modes.

According to the present invention, by appropriately designating the transfer mode, either a byte transfer or a word transfer, a DMA transfer can be performed at a high speed. Further, the period of using a bus, which is used in a data transfer, can be reduced, thereby allowing efficient use of the bus.

BRIEF DESCRIPTION OF THE DRAWINGS

FIG. 1 is a block diagram showing a configuration of a DMA device according to an embodiment of the present invention;

FIG. 2 is a view showing a DMA descriptor;

FIG. 7 is a view showing a data holding register in a DMA controller;

FIG. 9 is a timing chart of a data transfer from a transfer source having an 8-bit data bus width to a transfer destination having a 16-bit data bus width;

FIG. 12 is a view showing transfer modes;

FIG. 14 is a timing chart showing another DMA transfer according to the prior art.

DETAILED DESCRIPTION OF THE PREFERRED EMBODIMENTS

Figure 3:
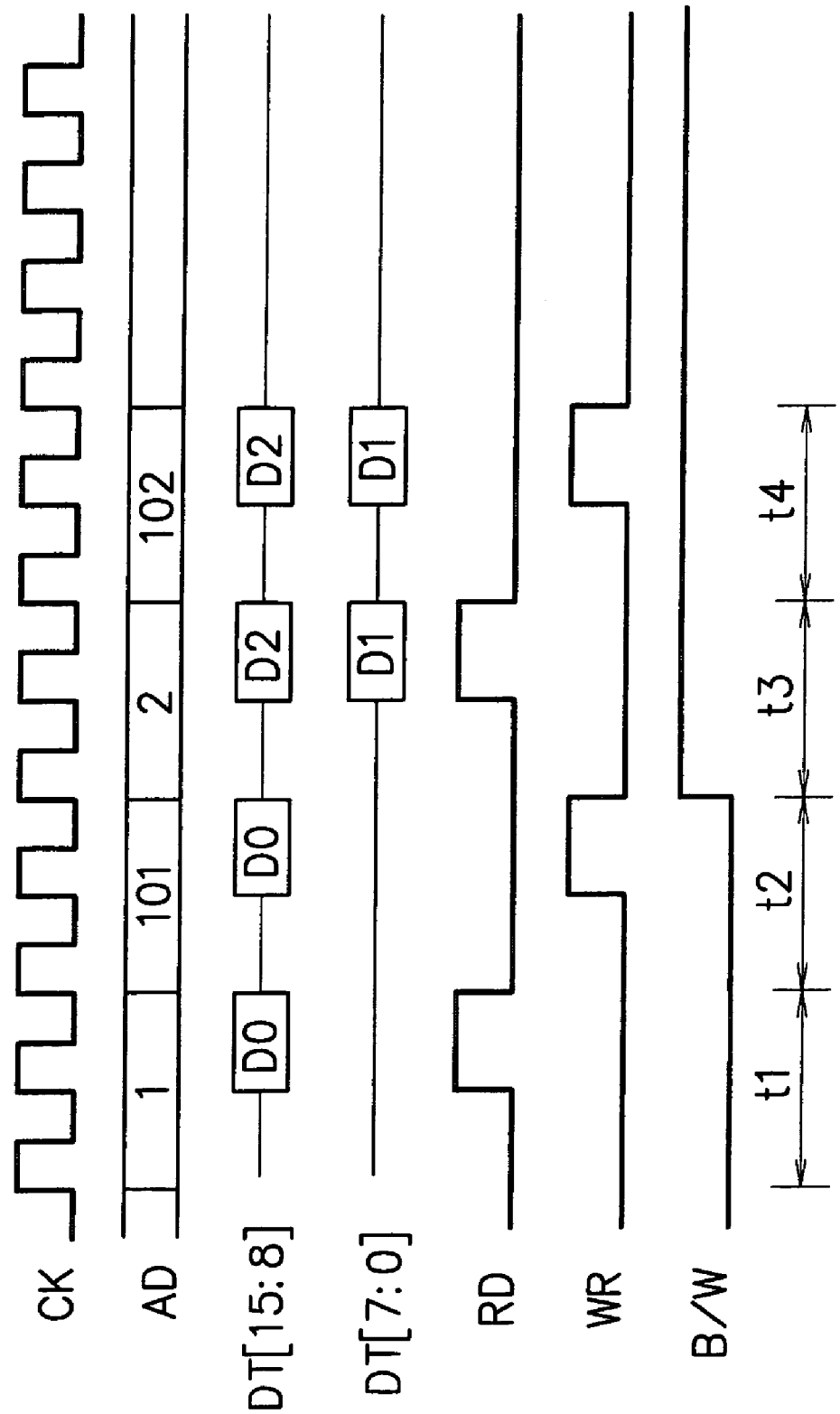
FIG. 3 is a timing chart showing a DMA transfer according to this embodiment.

FIG. 1 shows a configuration of a direct memory access (DMA) device according to an embodiment of the present invention. To a bus 101, a central processing unit (CPU) 102, a DMA controller (DMAC) 103, a memory 104, and an input/output (I/O) device 105 are connected. The memory 104 is connected to the bus 101 via a data bus 111. The input/output device 105 is connected to the bus 101 via a data bus 112.

A DMA transfer is explained. When a data transfer request signal, normally sent to and processed by the CPU 102, is issued from the input/output (I/O) device 105 or the memory 104 to the bus 101, the signal is received by the DMAC 103 and is processed not by the CPU 102 but by the DMAC 103. Therefore, the right of use of the bus 101 is transferred from the CPU 102 to the DMAC 103, and the CPU 102 thus stops during the operation of the DMAC 103. When starting transfer processing, the DMAC 103 reads transfer information such as a data transfer direction, the number of transfers and so on (see FIG. 2) from the memory 104 and then starts transfer processing in accordance with the information. When the transfer is completed or suspended, the DMAC 103 returns the right of use of the bus 101 to the CPU 102 and then terminates the transfer processing. The above is a series of operation of the DMA transfer.

The DMAC 103 performs a data transfer between the input/output device 105 and the memory 104 by direct memory access. Besides, if two memories 104 are connected to the bus 101, a data transfer between the memories 104 is possible. For example, when receiving from the input/output device 105 an instruction to transfer data, the DMAC 103 designates transfer modes, byte transfers or word transfers for first and last data of the data and word transfers for all other data, and a data transfer by direct memory access is performed from a data transfer source (for example, the input/output device 105) to a data transfer destination (for example, the memory 104) by the designated transfer modes.

FIG. 2 shows a DMA descriptor 201 stored in the memory 104. The DMA descriptor 201 has a transfer source address 202, a transfer destination address 203, a data counter 204, and a transfer data length specifying bit 205. The data counter 204 stores a total transfer data length and conducts down counting of the transfer data length every performance of transfer. As for the transfer data length specifying bit 205, 0 indicates the byte transfer and 1 indicates the word transfer.

FIG. 3 shows a direct memory access method according to this embodiment. In direct memory access (DMA), a data transfer is performed between an input/output device and a memory or between memories. A clock CK is a synchronous clock for DMA. As for an address AD, for example, locations 0 through 99 are data transfer source addresses and locations 100 through 199 are data transfer destination addresses. In the locations 1 to 3, data D0 to D2 are stored respectively. The data D0 to D2 are 1 byte each, and thus 3 bytes in total. A data bus DT is 1 word (16 bits) wide. As for the data bus DT, 0 to 7 bits are a first byte and 8 to 15 bits are a second byte. A case is explained in which a transfer source and a transfer destination data bus 111 and 112 are both 16 bits wide in FIG. 1. A pulse of a read signal RD indicates a read instruction, and a pulse of a write signal WR indicates a write instruction. A transfer mode B/W corresponds to the transfer data length specifying bit 205 in FIG. 2, and its low level indicates the byte transfer, and its high level indicates the word transfer. Hereinafter, in correspondence with FIG. 13, a case is explained in which the data D0 to D2 starting from an odd address (the location 1) and having a 3-byte (odd-byte) length are transferred.

First, the 1-byte data D0 are read from the location 1 of the address AD at a timing t1, and the 1-byte data D0 are written into the location 101 of the address AD at a timing t2. In short, a byte transfer is performed. Then, the 1-word data D1 and D2 are read from the location 2 of the address AD at a timing t3, and the 1-word data D1 and D2 are written into the location 102 of the address AD at a timing t4. In short, a word transfer is performed. In the above, assuming that a set of read and write is one cycle, this data transfer takes two cycles.

Figure 13:
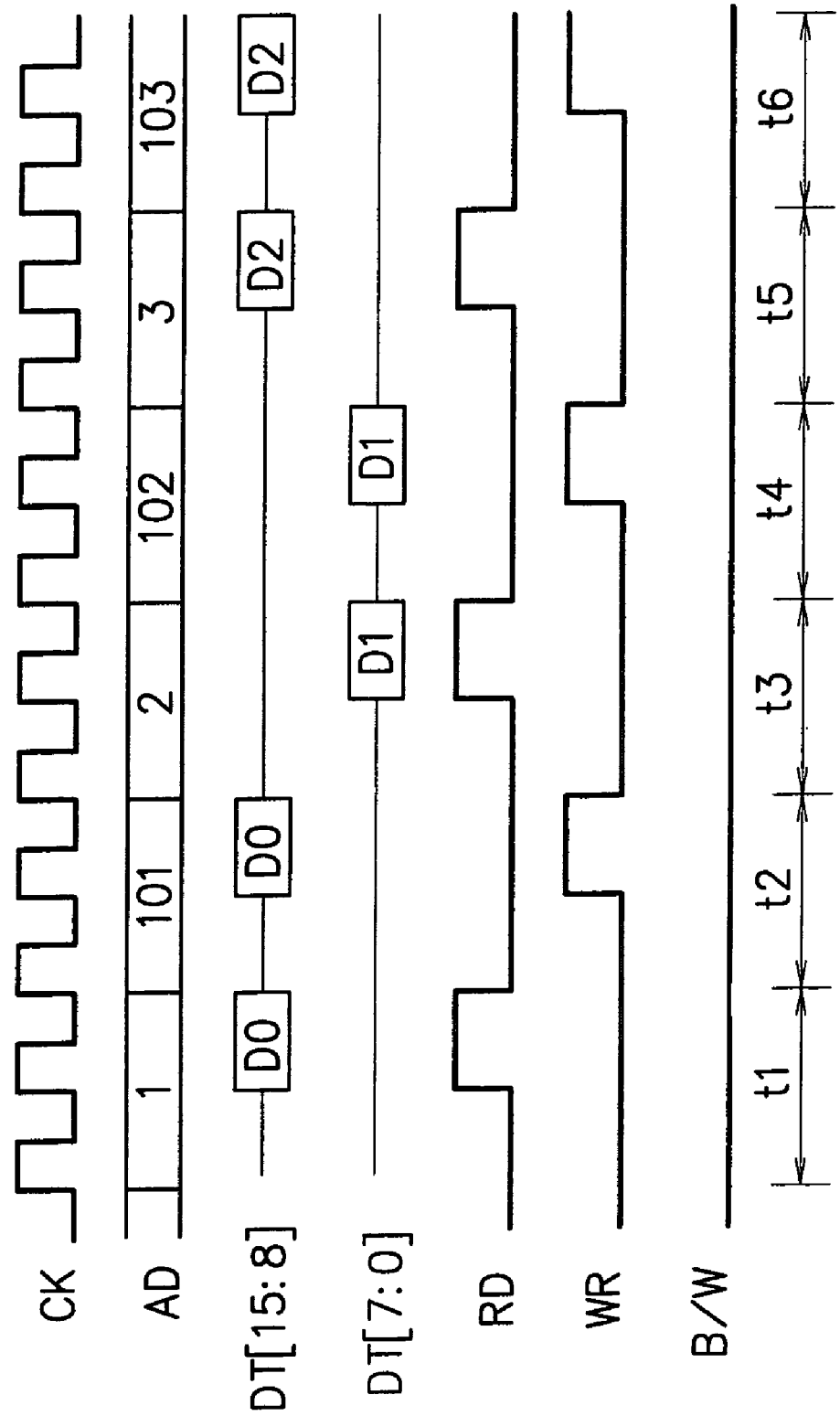
FIG. 13 is a timing chart showing a DMA transfer according to a prior art.

In the above-described method shown in FIG. 13, in the case of data starting from an odd address (the location 1), byte transfers are performed for all of the data. In comparison to this, in this embodiment, only first 1-byte data are transferred in bytes, and the following data are transferred in words. This enables a data transfer at a high speed.

It should be noted that in the case of transfer of data starting from an even address and having an odd-byte length, only last 1-byte data are transferred in bytes, and the other data are transferred in words. Besides, in the case of transfer of data starting from an odd address and having an even-byte length, only first and last data are transferred in bytes, and the other data are transferred in words. In the above, in this embodiment (FIG. 3), the bus 101 is less occupied than in the case in FIG. 13, thereby allowing the bus 101 to be used mode efficiently.

Figure 4:
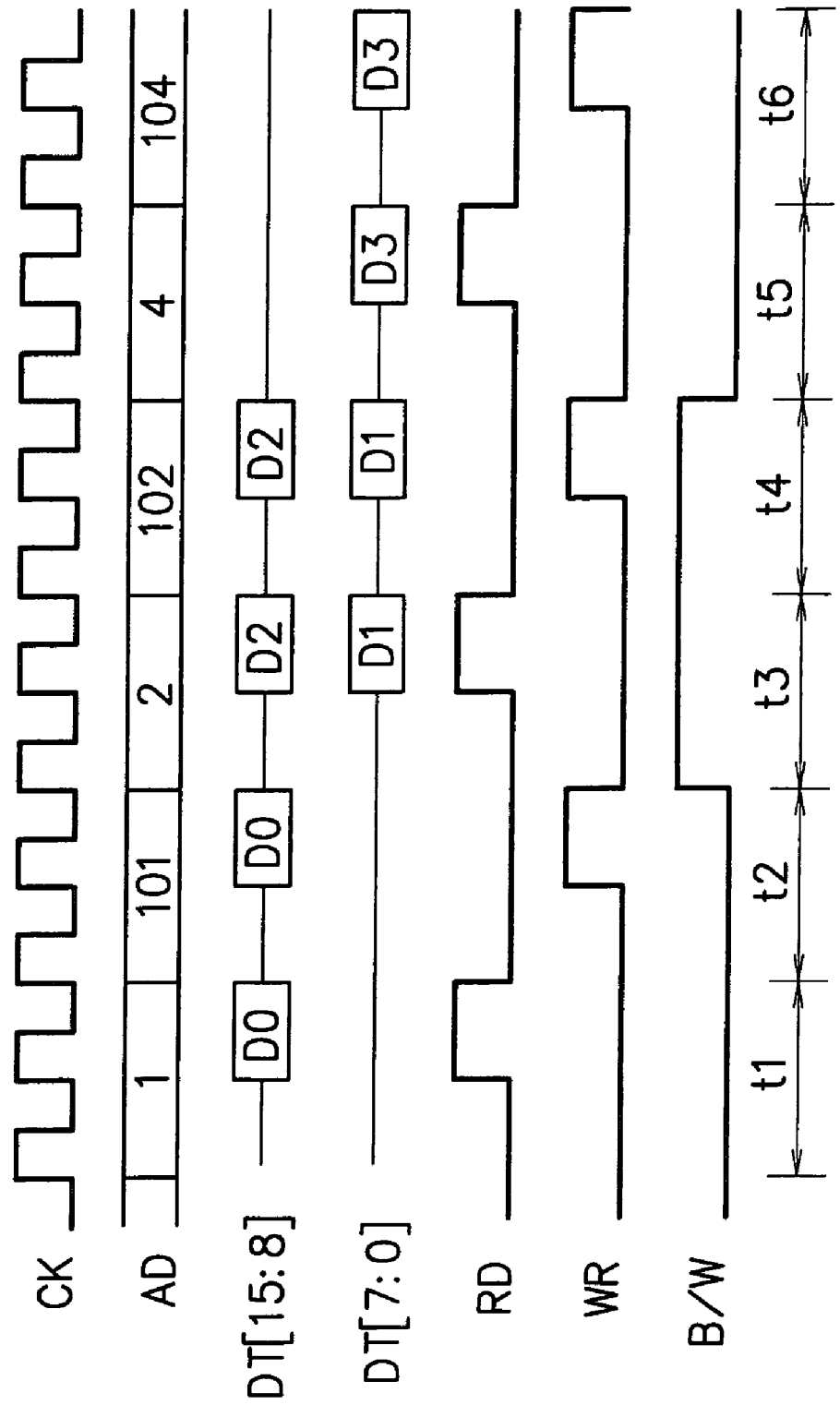
FIG. 4 is a timing chart showing another DMA transfer according to this embodiment.

FIG. 4 shows another DMA method according to this embodiment. Corresponding to FIG. 14, an exemplary case of transfer of data starting from a location 1 (an odd address) and having a 4-byte (even-byte) length is explained here.

First, 1-byte data D0 are read from a location 1 of an address AD at a timing t1, and the data D0 are written into a location 101 at a timing t2. In short, a byte transfer is performed. Then, 1-word data D1 and D2 are read from a location 2 at a timing t3, and the data D1 and D2 are written into a location 102 at a timing t4. In short, a word transfer is performed. At last, 1-byte data D3 are read from a location 4 at a timing t5, and the data D3 are written into a location 104 at a timing t6. In short, a byte transfer is performed.

As described above, in the case of the transfer of data starting from an odd address and having an even-byte length, both first and last data are transferred in bytes, and all other data are transferred in words. This data transfer is completed in three cycles. In this embodiment (FIG. 4), a data transfer is performed at a speed higher than in the case of FIG. 14, and the bus 101 is less occupied, thereby allowing the bus 101 to be used mode efficiently.

The DMAC 103 in FIG. 1 has registers Re[0] and Re[1] and decides transfer modes for first and last data in accordance with the registers. As for the register Re[0], 1 indicates that first data are transferred in bytes, and 0 indicates that first data are transferred in words. As for the register Re[1], 1 indicates that last data are transferred in bytes, and 0 indicates that last data are transferred in words.

Figure 5:
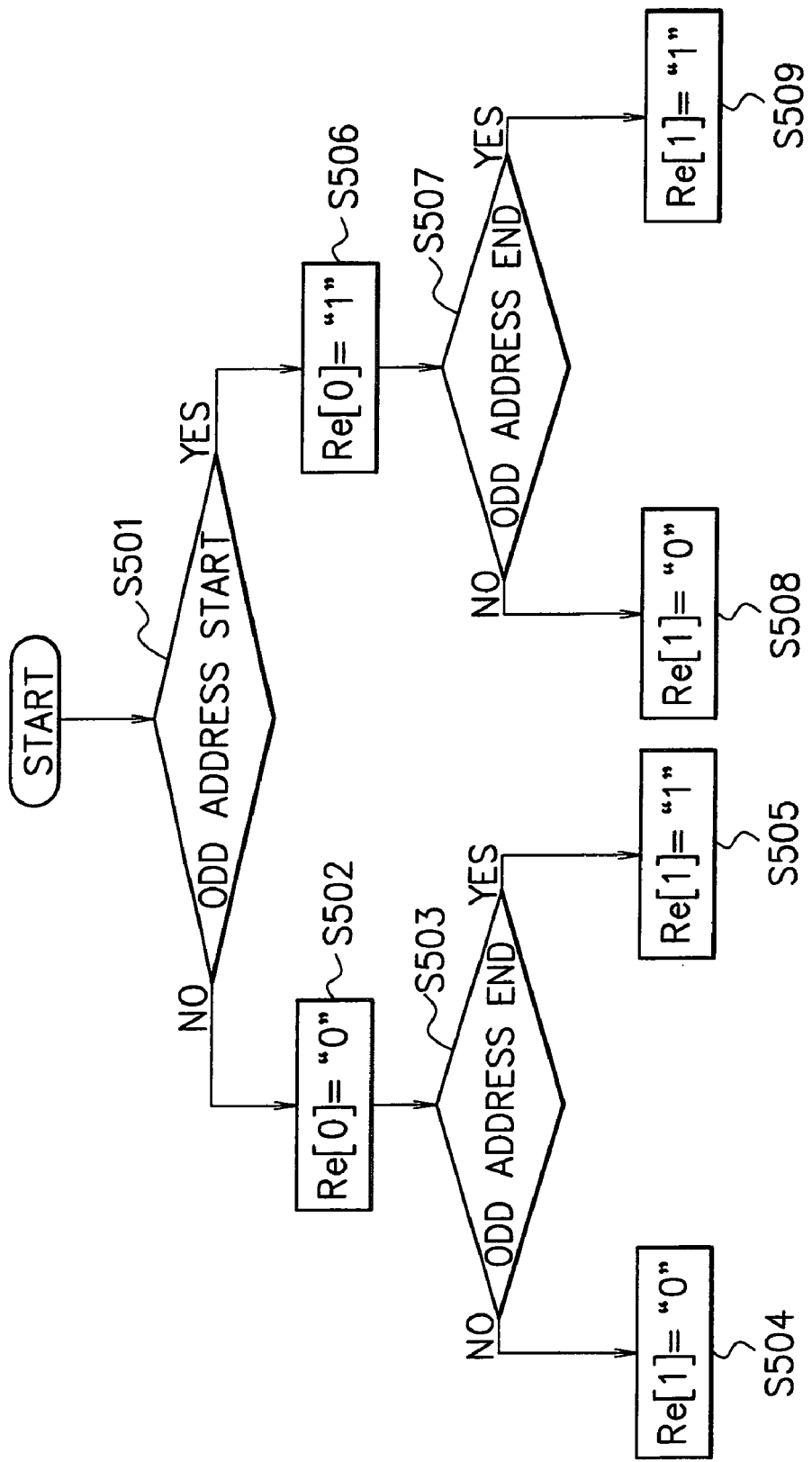
FIG. 5 is a flow chart showing processing of deciding values of registers Re[0] and Re[1]

FIG. 5 is a flow chart showing processing in which the DMAC 103 decides the values of the registers Re[0] and Re[1]. In step S501, the DMAC 103 determines whether or not data start from an odd address. The DMAC 103 proceeds to step S506 when the data start from an odd address, and proceeds to step S502 when the data start from an even address.

In step S502, the DMAC 103 sets 0 in the register Re[0], and proceeds to step S503. In step S506, the DMAC 103 sets 1 in the register Re[0], and proceeds to step S507.

In step S503, the DMAC 103 checks whether or not the last transfer address is an odd address (an odd-address end). The DMAC 103 proceeds to step S505 when it is an odd-address end, and proceeds to step S504 when it is an even-address end. In step S504, the DMAC 103 sets 0 in the register Re[1]. In step S505, the DMAC 103 sets 1 in the register Re[1].

In step S507, the DMAC 103 checks whether or not the last transfer address is an odd-address end. The DMAC 103 proceeds to step S509 when it is an odd-address end, and proceeds to step S508 when it is an even-address end. In step S508, the DMAC 103 sets 0 in the register Re[1]. In step S509, the DMAC 103 sets 1 in the register Re[1].

Note that, the determination in steps S503 and S507 is conducted at the time of transferring the last data. In other words, the determination is made when the value of the data counter 204 in FIG. 2 turns to 1.

Figure 6:
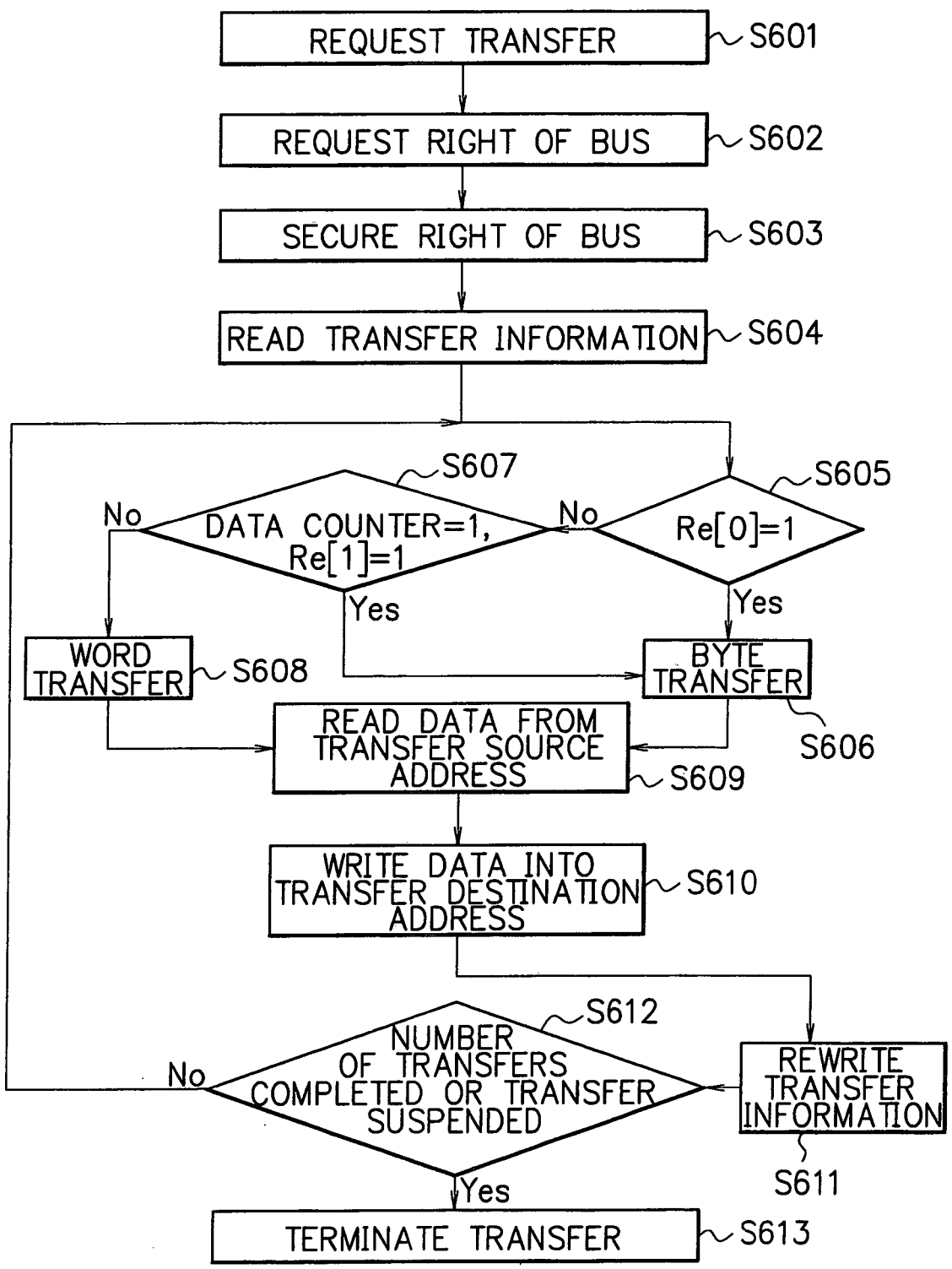
FIG. 6 is a flow chart showing transfer processing by DMA.

FIG. 6 is a flow chart showing data transfer processing by DMA.

In step S601, a transfer source (for example, the input/output device 105) outputs a data transfer request to the bus 101. In step S602, the DMAC 103 inputs a request for right of use of the bus in response to the data transfer request. In step S603, the DMAC 103 secures the right of use of the bus. The transfer information is written into the DMA descriptor 201 in FIG. 2. In step S604, the DMAC 103 reads the transfer information from the DMA descriptor 201. In reference to the transfer source address, the DMAC 103 determines whether data start from an odd address or an even address, and sets the value of the register Re[0] based on the result of determination. In short, steps S501 and S502 or S506 in FIG. 5 are conducted.

In step S605, the DMAC 103 checks whether or not the register Re[0] is 1. The DMAC 103 proceeds to step S606 when it is 1, and proceeds to step S607 when it is 0. In step S606, the DMAC 103 brings the transfer data length specifying bit 205 (FIG. 2) to 0 to thereby designate a byte transfer. Thereafter, the DMAC 103 proceeds to step S609. In step S607, the DMAC 103 checks whether or not conditions that the data counter 204 (FIG. 2) is 1 and the register Re[1] is 1 are satisfied. The data counter 204 indicates the number of the remaining data transfers. At the time of transferring the last data, the data counter 204 turns to 1. When the above-described conditions are satisfied, the DMAC 103 proceeds to step S606, and otherwise the DMAC 103 proceeds to step S608. In step S608, the DMAC 103 brings the transfer data length specifying bit 205 (FIG. 2) to 1 to thereby designate a word transfer. Thereafter, the DMAC 103 proceeds to step S609.

As described above, either the byte transfer mode or the word transfer mode is designated in accordance with the value of the register Re[0] for transfer of the first data. According to the transfer mode, the DMAC 103 reads data from the transfer source address 202 in step S609, and writes the data into the transfer destination address 203 in step S610. In short, the DMAC 103 performs a byte transfer or a word transfer from the transfer source to the transfer destination.

Subsequently, in step S611, the DMAC 103 rewrites the transfer information. Specifically, the DMAC 103 increases the transfer source address 202 and the transfer destination address 203 and decreases the data counter 204 in number. Note that, at the time of first transfer, the DMAC 103 sets the register Re[0] to 0. At the time of last transfer, referring to the transfer source address, the DMAC 103 determines whether it is an odd-address end or an even-address end and sets the value of the register Re[1] in accordance with the result of the determination. In short, steps S503 to S505 or S507 to S509 in FIG. 5 are conducted.

Subsequently, in step S612, the DMAC 103 checks whether the number of transfers is completed or there is an instruction to suspend the transfer. When the data counter 204 is 0, the DMAC 103 can determine that the number of transfers is completed. When the aforementioned instruction exits, the DMAC 103 proceeds to step S613 and terminates the transfer processing. Otherwise, the DMAC 103 returns to step S605.

Thereafter, through steps S605 and S607, the word transfer is designated in step S608, so that word transfers are repeatedly performed. Then, at the time of last transfer, the DMAC 103 checks whether or not the register Re[1] is 1, and performs a byte transfer when Re[1] is 1, and performs a word transfer when it is 0.

In the above, the case has been explained in which the width of the data bus 111 of the memory 104 and the width of the data bus 112 of the input/output device 105 in FIG. 1 are the same 16-bit width. Next, a case is explained in which the data widths of a transfer source and a transfer destination are different such that, for example, the data bus 111 of the memory has a 16-bit width and the data bus 112 of the input/output device has an 8-bit width.

FIG. 7 shows a data holding register 701 in the DMAC 103. The data holding register 701 has a plurality of byte registers. A bit length 703 is a bit length of one byte register. A byte length 702 is a total bit length of all the registers. The bit length 703 corresponds to, for example, the data bus 112 of the input/output device and is 8 bits. The bit length 702 corresponds to, for example, the data bus 111 of the memory and is 16 bits.

At the time of transfer from the input/output device 105 to the memory 104, it is assumed that the data bus width of the input/output device 105 is 8 bits, and the data bus width of the memory 104 is 16 bits. In this case, the transfer is not performed every 8 bits of data to match the data bus width of the input/output device 105, but performed by temporarily holding the data from the input/output device 105 in the register 701 in the DMAC 103 and outputting the data to the memory 104 when 16 bits of data are stored which correspond to the data bus width of the memory 104 being the transfer destination. Conversely, at the time of transfer from the memory 104 to the input/output device 105, the transfer is performed by holding 16 bits of data from the memory 104 in the register 701 in the DMAC 103 and outputting the data to the input/output device 105 by 8 bits which correspond to the data bus width of the input/output device 105 being the transfer destination. As a result, instead of use of the bus at all times by 8-bit transfer to match the data bus width of the input/output device 105 having a smaller data bus width, data are temporarily stored in the register 701 in the DMAC 103, thereby reducing the period of occupying the bus 101 at the time of data transfer to allow efficient use of the bus 101.

Figure 8:
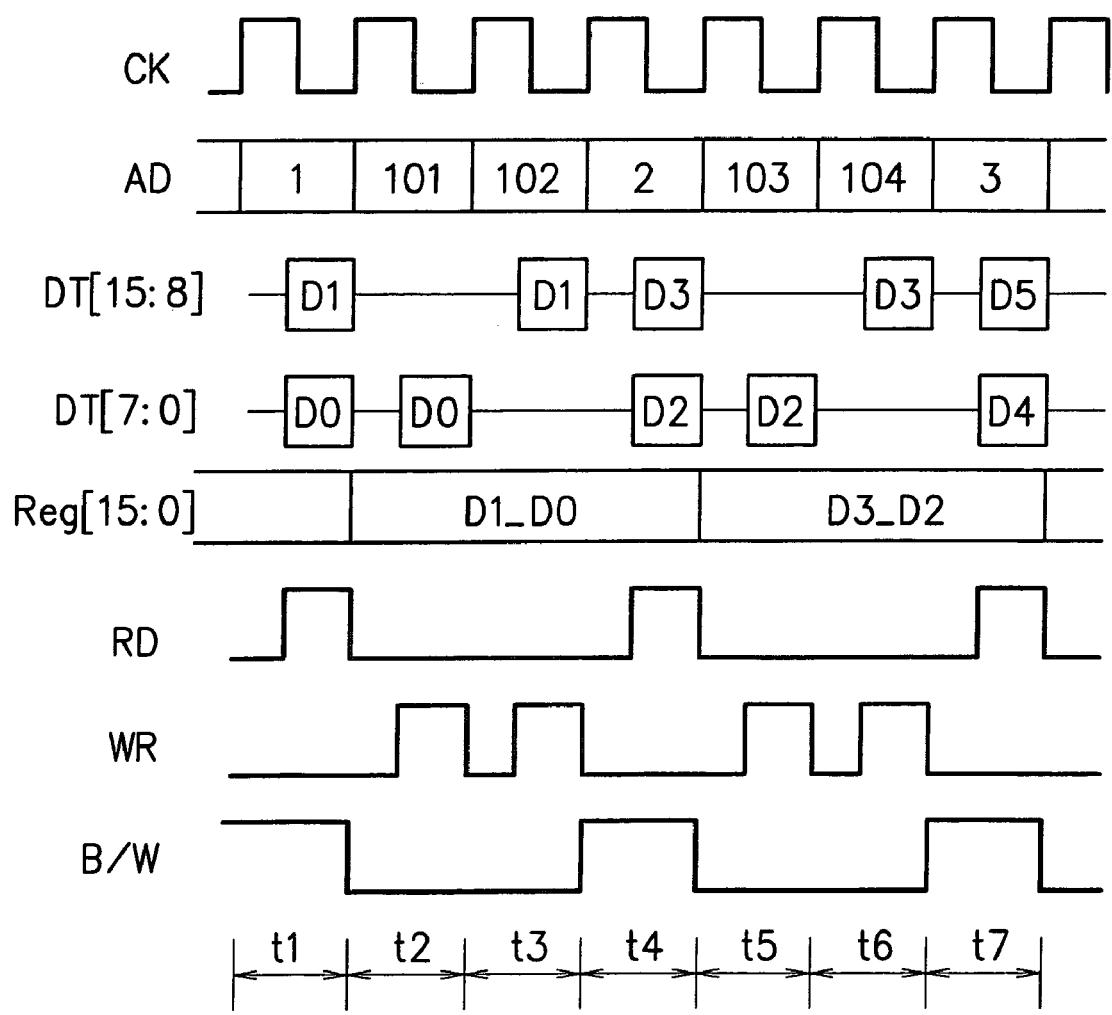
FIG. 8 is a timing chart of a data transfer from a transfer source having a 16-bit data bus width to a transfer destination having an 8-bit data bus width.

FIG. 8 is a timing chart of data transfer between a transfer source and a transfer destination having different data bus widths. A case is shown in which the data bus width of the transfer source is 16 bits and the data bus width of the transfer destination is 8 bits.

First, at a timing t1, 16-bit data D0 and D1 are read from a location 1 of the transfer source by a word transfer and written into a 16-bit register Reg. The register Reg corresponds to the register 701 in FIG. 7.

Subsequently, at a timing t2, the data D0 in lower 8 bits of the register Reg are written into a location 101 of the transfer destination by a byte transfer.

Subsequently, at a timing t3, the data D1 in upper 8 bits of the register Reg are written into a location 102 of the transfer destination by a byte transfer.

Subsequently, at a timing t4, 16-bit data D2 and D3 are read from a location 2 of the transfer source by a word transfer and written into the register Reg.

Subsequently, at a timing t5, the data D2 in the lower 8 bits of the register Reg are written into a location 103 of the transfer destination by a byte transfer.

Subsequently, at a timing t6, the data D3 in the upper 8 bits of the register Reg are written into a location 104 of the transfer destination by a byte transfer.

Subsequently, at a timing t7, 16-bit data D4 and D5 are read from a location 3 of the transfer source by a word transfer and written into the register Reg.

FIG. 9 is a timing chart of data transfer from a transfer source having an 8-bit data bus width to a transfer destination having a 16-bit data bus width.

First, at a timing t1, 8-bit data D0 are read from a location 101 of the transfer source by a byte transfer and written into lower 8 bits of the register Reg.

Subsequently, at a timing t2, 8-bit data D1 are read from a location 102 of the transfer source by a byte transfer and written into upper 8 bits of the register Reg.

Subsequently, at a timing t3, the 16-bit data D0 and D1 in the register Reg are written into a location 1 of the transfer destination by a word transfer.

Subsequently, at a timing t4, 8-bit data D2 are read from a location 103 of the transfer source by a byte transfer and written into the lower 8 bits of the register Reg.

Subsequently, at a timing t5, 8-bit data D3 are read from a location 104 of the transfer source by a byte transfer and written into the upper 8 bits of the register Reg.

Subsequently, at a timing t6, the 16-bit data D2 and D3 in the register Reg are written into a location 2 of the transfer destination by a word transfer.

Subsequently, at a timing t7, 8-bit data D4 are read from a location 105 of the transfer source by a byte transfer and written into the lower 8 bits of the register Reg.

Figure 10:
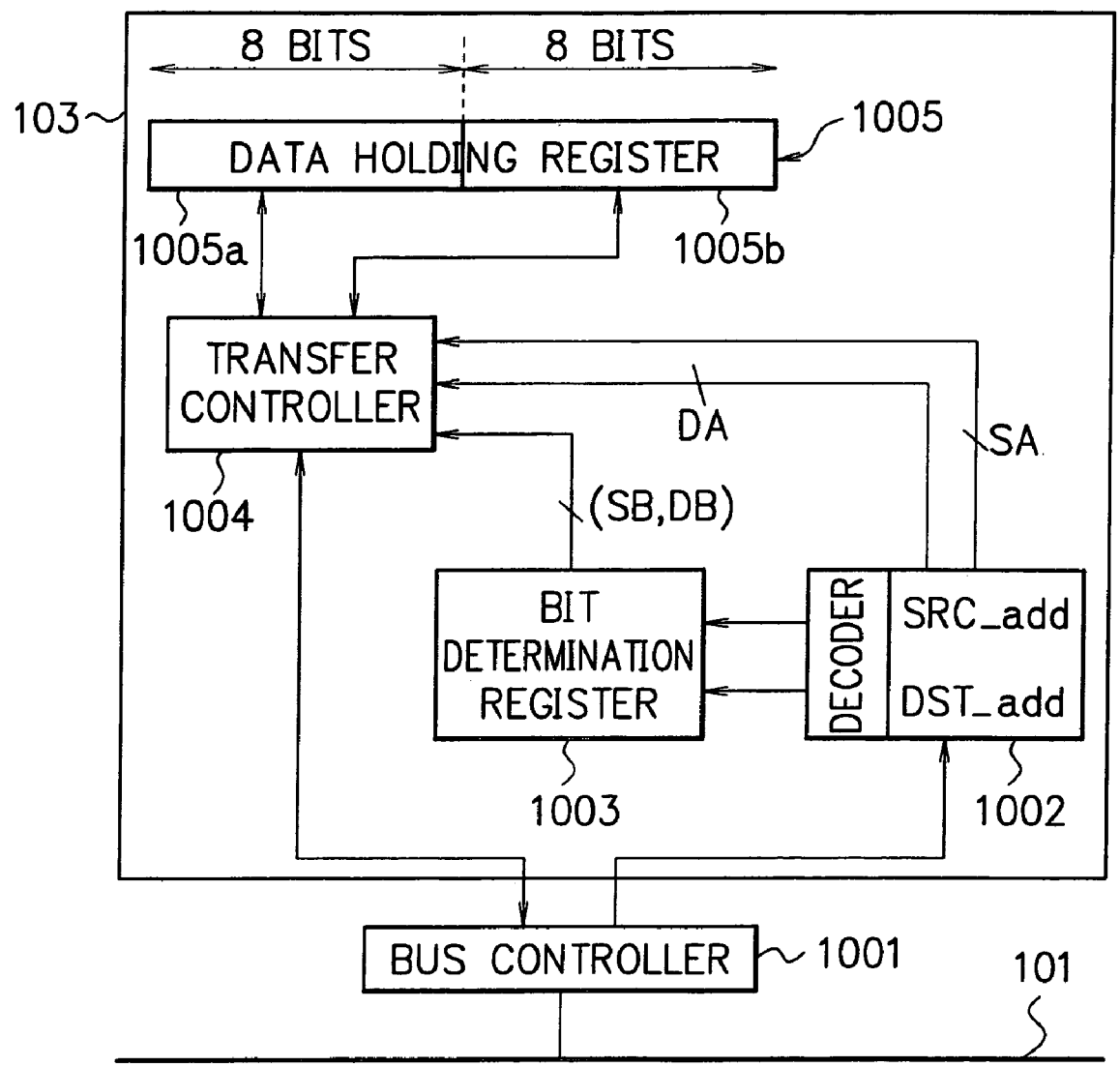
FIG. 10 is a view showing a configuration of the DMA controller containing a data holding register.

FIG. 10 is a detail view of the DMAC 103 containing a data holding register 1005. The data holding register 1005 has two byte registers 1005a and 1005b. Each of the registers 1005a and 1005b is 8 bits long. The data holding register 1005 is a word register having a 16-bit length and is required to temporarily hold data when a DMA transfer is performed between data buses having different widths.

A bus controller 1001 inputs and outputs necessary data to and from a transfer controller 1004 and an address storage 1002 via the bus 101. The address storage 1002 has a decoder and stores therein a transfer source address SRC_add and a transfer destination address DST_add which are supplied from the descriptor 201 in FIG. 2. The address storage 1002 outputs signals SA and DA to the transfer controller 1004 in accordance with the transfer source address SRC_add and the transfer destination address DST_add. The signal SA is 1 when the transfer source address SRC_add is an odd address and is 0 when it is an even address. The signal DA is 1 when the transfer destination address DST_add is an odd address and is 0 when it is an even address.

A bit determination register 1003 outputs signals SB and DB to the transfer controller 1004 in accordance with data bus widths of the addresses SRC_add and DST_add which have been decoded in the address storage 1002. The signal SB is 0 when the data bus width of the transfer source address SRC_add is 8 bits and is 1 when it is 16 bits. The signal DB is 0 when the data bus width of the transfer destination address DST_add is 8 bits and is 1 when it is 16 bits.

Figure 11:
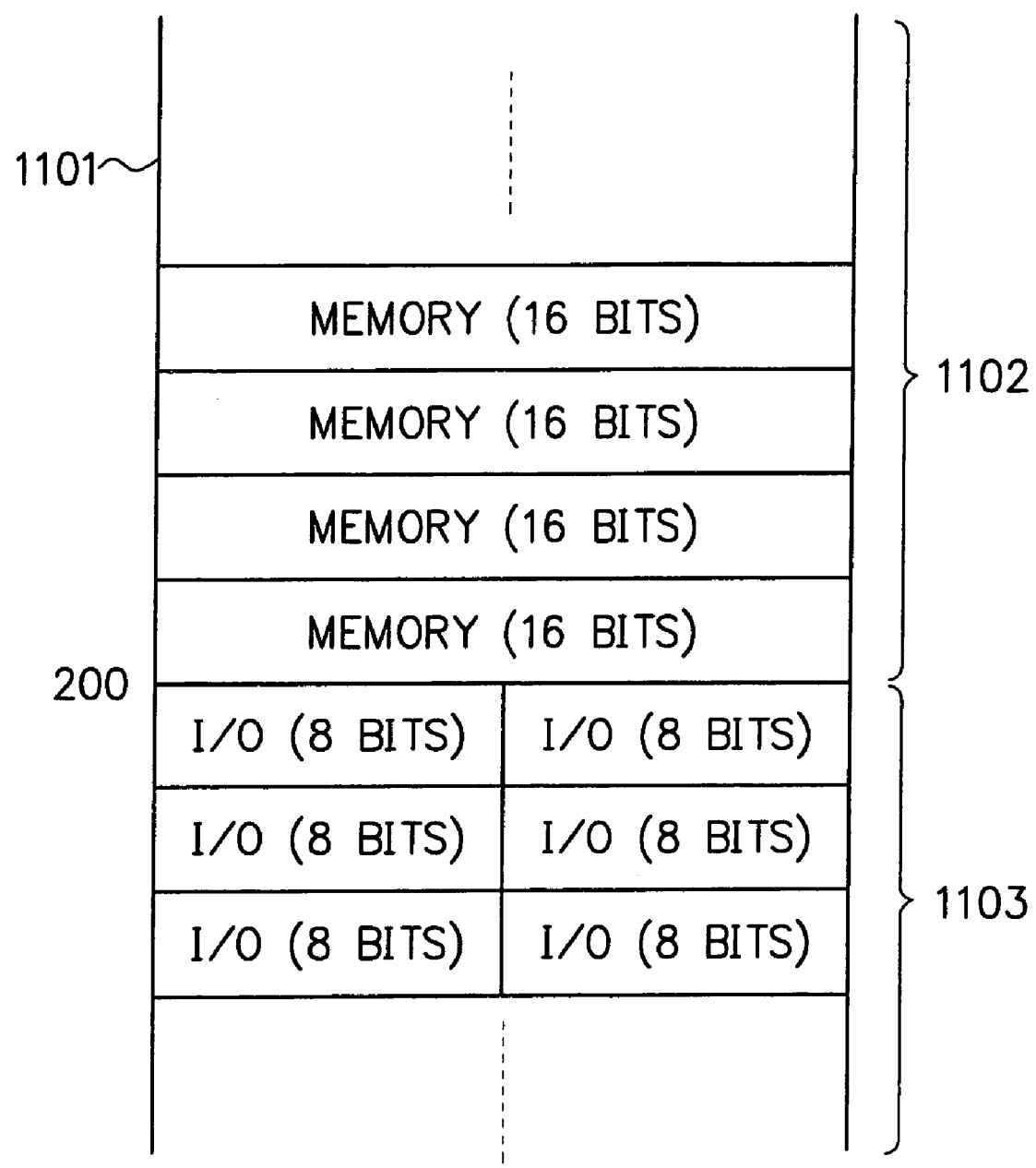
FIG. 11 is a view showing an address space partitioned in accordance with data bus widths.

FIG. 11 shows a determining method of the data bus width. An address space 1101 has, for example, an address space 1102 for addresses smaller than a location 200 and an address space 1103 for locations 200 and greater. The address space 1102 is an address space for a resource having a data bus width of 16 bits and is an address space for, for example, the memory 104. The address space 1103 is an address space for a resource having a data bus width of 8 bits and is an address space of, for example, the input/output device 105. The address space is partitioned as described above, so that the decoder in the address storage 1002 in FIG. 10 determines, in accordance with addresses SRC_add and DST_add, the data bus widths of a resource at the addresses, and the bit decision register 1003 outputs the signals SB and DB.

In FIG. 10, the transfer controller 1004 controls the transfer mode shown in FIG. 12 in accordance with the signals SA, DA, SB and DB to perform a data transfer. When the signals (SB, DB) are (0, 0) or (1, 1), the transfer controller 1004 performs a normal DMA transfer shown in the above-described FIG. 6. When the signals (SB, DB) are (1, 0) or (0, 1), the transfer controller 1004 performs the DMA transfer for the case of different data bus widths. Here, the case of (1, 0) indicates that the transfer source is 16 bits and the transfer destination is 8 bits, in which transfer is from a wide data bus to a narrow data bus. In this case, 16 bit-data are first transferred from the transfer source having the wide data bus width to the data holding register 1005. Then, the data are transferred by 8 bits from the register 1005 to the transfer destination having the narrow data bus width. On the other hand, the case of (0, 1) indicates that the transfer source is 8 bits and the transfer destination is 16 bits, in which transfer is from a narrow data bus to a wide data bus. In this case, data are first transferred by 8 bits from the transfer source having the narrow data bus width to the data holding register 1005 until 16 bits of data are held in the data holding register 1005. Then, the 16-bit data are transferred from the register 1005 to the transfer destination having the wide data bus width.

Referring to FIG. 12, a specific transfer method is explained next. In selection of the transfer mode, since the transfer source address 202 and the transfer destination address 203 in FIG. 2 are changed every transfer from a transfer source to a transfer destination, the transfer source address signal SA and the transfer destination address signal DA are determined every transfer.

(A) The case of SA=0, DA=0, SB=0, DB=1

The transfer source has an 8 bit-bus width and the transfer destination has a 16-bit bus width. Eight-bit data at an even address in the transfer source are transferred to the lower byte register 1005a of the data holding register.

(B) The case of SA=0, DA=1, SB=0, DB=1

The transfer source has an 8-bit bus width and the transfer destination has a 16-bit bus width. Eight-bit data at an even address in the transfer source are transferred to the upper byte register 1005b of the data holding register.

(C) The case of SA=1, DA=0, SB=0, DB=1

The transfer source has an 8-bit bus width and the transfer destination has a 16-bit bus width. Eight-bit data at an odd address in the transfer source are transferred to the upper byte register 1005b of the data holding register.

(D) The case of SA=1, DA=1, SB=0, DB=1

The transfer source has an 8-bit bus width and the transfer destination has a 16-bit bus width. Eight-bit data at an odd address in the transfer source are transferred to the lower byte register 1005a of the data holding register.

(E) The case of SA=0, DA=0, SB=1, DB=0

The transfer source has a 16-bit bus width and the transfer destination is an 8-bit bus width. The 8-bit data in the lower byte register 1005a of the 16-bit data in the data holding register 1005, which have been transferred from the transfer source, are transferred to the transfer destination.

(F) The case of SA=0, DA=1, SB=1, DB=0

The transfer source has a 16-bit bus width and the transfer destination is an 8-bit bus width. The 8-bit data in the upper byte register 1005b of the 16-bit data in the data holding register 1005, which have been transferred from the transfer source, are transferred to the transfer destination.

(G) The case of SA=1, DA=0, SB=1, DB=0

The transfer source has a 16-bit bus width and the transfer destination is an 8-bit bus width. The 8-bit data in the upper byte register 1005b of the 16-bit data in the data holding register 1005, which have been transferred from the transfer source, are transferred to the transfer destination.

(H) The case of SA=1, DA=1, SB=1, DB=0

The transfer source has a 16-bit bus width and the transfer destination is an 8-bit bus width. The 8-bit data in the lower byte register 1005a of the 16-bit data in the data holding register 1005, which have been transferred from the transfer source, are transferred to the transfer destination.

As described above, the DMA device of this embodiment includes: a designation unit for designating transfer modes, when receiving an instruction to transfer data, to perform byte transfers or word transfers for first and last data of the data and word transfers for all other data; and a transfer unit for performing a data transfer by direct memory access from a data transfer source to a data transfer destination by the designated transfer modes. This allows the bus to be used more efficiently than in the cases in FIG. 13 and FIG. 14, thereby enabling a DMA transfer at a high speed. In addition, a problem in the word transfer relating to an odd address (data corruption or the like), can be avoided.

Further, the DMA device of this embodiment includes a determination unit for determining whether or not data bus widths of a data transfer source and a data transfer destination are different, and performs, when the data transfer source is narrower than the data transfer destination in data bus width, a direct memory access data transfer by inputting data from the data transfer source by the data bus width of the data transfer source until data corresponding to the data bus width of the data transfer destination are stored, and thereafter outputting to the data transfer destination the data corresponding to the data bus width of the data transfer destination. Conversely, when the data transfer source is wider than the data transfer destination in data bus width, the DMA device of this embodiment performs a direct memory access data transfer by inputting from the data transfer source data corresponding to the data bus width of the data transfer source, and outputting the data to the data transfer destination by the data bus width of the data transfer destination. The transfer through the use of the register 1005 in FIG. 10 allows the bus to be used efficiently, thereby enabling an improvement in transfer capability.

In this event, as shown in FIG. 11, the determination unit previously decides addresses of the data transfer source and the data transfer destination in accordance with the data bus widths thereof, and determines the data bus width of the data transfer source and the data bus width of the data transfer destination based on the data transfer source address and the data transfer destination address to thereby determine whether or not both the data bus widths are different.

Further, as shown in FIG. 10, the determination unit determines whether or not data bus widths of a data transfer source and a data transfer destination are different, and whether a data transfer source address and a data transfer destination address are even addresses or odd addresses respectively, and the transfer controller 1004 controls the data transfer mode by direct memory access from the data transfer source to the data transfer destination in accordance with determination results thereof.

The present embodiments are to be considered in all respects as illustrative and no restrictive, and all changes which come within the meaning and range of equivalency of the claims are therefore intended to be embraced therein. The invention may be embodied in other specific forms without departing from the spirit or essential characteristics thereof.

As has been described, by appropriately designating the transfer mode, either a byte transfer or a word transfer, a DMA transfer can be performed at a high speed. Further, the period of using a bus, which is used in a data transfer, can be reduced, thereby allowing efficient use of the bus.

What is claimed is:

1. A direct memory access device, comprising:
   a designation unit for designating transfer modes, when receiving an instruction to transfer data, to perform byte transfers, in response to a first control signal at a first level, and word transfers, in response to the first control signal at a second level for first data of the data to be transferred and to perform byte transfers, in response to a second control signal at a first level and word transfers, in response to the second control signal at a second level for last data of the data to be transferred and word transfers for all other data between the first and last data of the data to be transferred; and
   a transfer unit for performing a data transfer by direct memory access from a data transfer source to a data transfer destination by said designated transfer modes, wherein
   the first control signal is based solely on the physical address of a first data byte and the second control signal is based solely on the physical address of the last data byte of the data to be transferred.

2. The direct memory access device according to claim 1, wherein
   said designation unit designates said transfer modes by writing said transfer modes into a register.

3. The direct memory access device according to claim 2, wherein
   said register includes information for designating either a byte transfer or a word transfer for said first data and either a byte transfer or a word transfer for said last data.

4. The direct memory access device according to claim 3, wherein
   said register includes a first bit for designating either a byte transfer or a word transfer for said first data, and a second bit for designating either a byte transfer or a word transfer for said last data.

5. The direct memory access device according to claim 4, wherein
said designation unit designates either byte transfers or word transfers for said first and last data respectively in accordance with transfer source addresses and transfer destination addresses of said first and last data being odd addresses or even addresses respectively.

6. The direct memory access device according to claim 4, wherein
said designation unit designates, when transferring data starting from an odd address and having an even-byte length, to perform byte transfers for both first and last data and word transfers for all other data.

7. The direct memory access device according to claim 5, wherein
said transfer unit performs a data transfer between an input/output device and a memory or between memories.

8. The direct memory access device according to claim 1, wherein
said designation unit designates either byte transfers or word transfers for said first and last data respectively in accordance with transfer source addresses and transfer destination addresses of said first and last data being odd addresses or even addresses respectively.

* * * * *